United States Patent [19]

Lauri

[11] Patent Number: 5,216,039

[45] Date of Patent: Jun. 1, 1993

[54] PROCESS FOR PRODUCING A FOAMED POLYMER ENDOWED WITH HIGH RESISTANCE TO SOLVENTS AND HIGH TEMPERATURE RESISTANCE

[75] Inventor: Leone Lauri, Ponte Nelle Alpi, Italy

[73] Assignee: Polimex S.p.A., Padua, Italy

[21] Appl. No.: 810,501

[22] Filed: Dec. 19, 1991

[30] Foreign Application Priority Data

May 17, 1991 [IT] Italy .................... MI 91/A 001357

[51] Int. Cl.$^5$ .................... C08G 18/00; B29C 67/22
[52] U.S. Cl. .................... 521/128; 521/157; 264/54; 264/234
[58] Field of Search .................... 264/55, 51, 54, 232, 264/234; 521/94, 128, 145, 146, 157

[56] References Cited

U.S. PATENT DOCUMENTS

| | | | |
|---|---|---|---|
| 2,576,749 | 11/1951 | Carpentier | 264/55 |
| 3,200,089 | 8/1965 | Landler et al. | 521/94 |
| 3,256,217 | 6/1966 | Landler et al. | 521/79 |
| 3,267,051 | 8/1966 | Landler et al. | 521/94 |
| 3,277,028 | 10/1966 | Parker et al. | 264/54 |
| 4,328,136 | 5/1982 | Blount | 106/287.12 |
| 4,377,644 | 3/1983 | Kopp et al. | 521/128 |
| 4,430,454 | 2/1984 | Castrantas et al. | 521/128 |

Primary Examiner—Allan R. Kuhns
Attorney, Agent, or Firm—Shea & Gould

[57] ABSTRACT

A process for producing a foamed polymer comprises the steps of: mixing, in a dissolver, a mixture constituted by at least one isocyanate and a first unsaturated anhydride, which is charged to the dissolver in the liquid state and at a relatively high temperature; progressively cooling said mixture, with continued stirring, until a temperature not higher than 22° C. is reached; adding to the mixture, with the latter being still kept with continuous stirring, a second unsaturated anhydride, at least one foaming agent, a vinylidene compound, poly(vinyl chloride) and a heat stabilizer; maintaining the mixture with continuous stirring, at said temperature, until a paste is obtained which is poured, after being preliminarily filtered, into a mould or container; curing said paste by charging the container to an oven at atmospheric pressure, and at a temperature not higher than 80° C.; completing the curing of the paste-like mixture under pressure, by increasing temperature up to 180° C. and subsequent cooling, until partially foamed germs are obtained; and completing the germ foaming process, by heating.

12 Claims, No Drawings

PROCESS FOR PRODUCING A FOAMED POLYMER ENDOWED WITH HIGH RESISTANCE TO SOLVENTS AND HIGH TEMPERATURE RESISTANCE

The preferred, well-known manufacturing process to produce a cellular foamed body based on a vinyl chloride polymer or copolymer, uses a mixture of one or more isocyanates, such as toluenediisocyanate, polymethylenepolyphenylisocyanate, poly(vinyl chloride), maleic anhydride, one or more vinylidene compounds, such as styrene and acrylonitrile, a foaming agent, such as azodiisobutyronitrile, one or more stabilizer compounds, such as tribasic lead sulfate, dibasic lead phosphite, dibasic lead phthalate, or barium-cadmium-zinc, lead-barium complexes.

Said mixture, which, after compounding, shows a paste-like consistency, is poured into a mould, and then the temperature of the mould is increased, under pressure, until a value of 180° C. is reached, to cause poly(vinyl chloride) to gel. The semifoamed article obtained in that way—also designated "germ"—will be caused to complete its foaming by heating it in the presence of water or steam.

This type of production process is not very suitable for a large-scale commercial production, in that compound lots exceeding a certain weight—about 300–400 kg—cannot be prepared, with the number of produced germs being consequently reduced; the solution containing maleic anhydride, vinylidene compound, isocyanate is laborious and not very reliable, and, inasmuch as it is prepared at a temperature comprised within the range of from 30° C. to 35° C., when it comes into contact with the other components, the above described mixture causes the compound which is being prepared to densify, and eventually causes it to become unusable.

The general purpose of the present invention is of solving the above technical problems, by providing a production process which can be used at the commercial level, in a reliable and certain way.

The process according to the present invention and the products obtained from it are disclosed in the following disclosure, and are defined in the appended claims.

One or more isocyanates, such as 2,4-2,6-toluenediisocyanate, 4,4'-diphenylmethane diisocyanate, and a first unsaturated anhydride, such as maleic anhydride, are charged to a dissolver. Maleic anhydride, charged in the liquid state, at the temperature of 70° C., with the reaction mixture being kept constantly stirred, with the impeller of the dissolver revolving at a peripheral speed comprised within the range of from 20 feet/second to 30 feet/second, preferably of 26.8 feet/second, said mixture is progressively cooled, until a temperature is reached, which is comprised within the range of from 14° C. to 18° C. After reaching this temperature, which is then kept constant, a second anhydride, such as phthalic anhydride, one or more foaming agents, such as azodiisobutyronitrile and azodicarbonamide, a vinylidene compound, such as styrene, poly(vinyl chloride) and a heat stabilizer, are added to the dissolver. The compounding is continued, still with cooling, with the peripheral speed of the impeller set at a value comprised within the range of from 53 feet/second to 76 feet/second, and preferably of 67 feet/second.

In that way, a perfectly homogeneous paste-like compound ("paste") is obtained, which, after filtration, is poured into suitable containers for the subsequent "curing" process, or directly into the mould(s). During this operation, the temperature of the compound is kept comprised within the range of from 18° C. to 22° C. The filtration of the paste is essential, in order to eliminate the presence of impurities deriving from the raw materials which are used to prepare the compound. It is necessary to prevent the presence of impurities because, during the foaming step, in the cellular structure of the foamed plastic article cavities or cracks may develop, which would then render unusable the finished article.

The "grafting" reaction of maleic anhydridestyrene-poly(vinyl chloride) is initiated by charging the paste, inside suitable containers, to ovens inside which air is kept circulating at a speed of 0.5-2 m/second, relative environmental humidity is of 15-20%, and temperature is comprised within the range of from a minimum value of 35° C. up to a maximum value of 80° C., for a reaction time of from 1 to 6 hours. In that way, bodies are obtained, the hardness of which is such that they can be mechanically handled to be charged to the hollows of the moulds.

The reaction is then brought to completeness under pressure, and progressively increasing temperature, with the foaming agents undergoing decomposition—with azodiisobutyronitrile also acting as a "polymerization initiator"—and when the temperature of 170° C.–180° C. is reached, the gelation of poly(vinyl chloride) takes place. During the cooling step, partially foamed germs are obtained, which will end their foaming process by being heated inside ovens, in the presence of steam.

The process of paste "curing" makes it possible to reduce the time of "pressure heating/cooling" cycle, from a minimum of 30% up to a maximum of 40%, with the depth of the hollow of the mould being the same, as compared to the production processes known from the prior art. Inside ovens at atmospheric pressure, under such a dynamic atmosphere of saturated steam that in each point inside the oven, the difference between the local temperature and the setpoint temperature of oven is of ±2° C., with isocyanates and anhydrides reacting with water, the semifoamed germs will end their foaming process, reaching the desired density, within a time ranging from 4 to 35 hours.

In order to obtain a cellular foamed article anyway endowed with high temperature resistance and good resistance to chemical attack, by following the same operating modalities, a paste can be used, which consists of a mixture of one or more isocyanates, such as 2,4-2,6-toluenediisocyanate and/or 4,4'-diphenyl methane diisocyanate, two anhydrides, such as maleic anhydride and phthalic anhydride, poly(vinyl chloride), one or more foaming agents, such as azodiisobutyronitrile and azodicarbonamide, one or more heat stabilizers, and, if desired, high-colouring power pigments.

Examples for the production on the industrial scale, according to the present process, of cellular foamed articles based on poly(vinyl chloride).

EXAMPLE 1

In a paste constituted by a mixture of:

| from | 1% to | 20% of 4,4'-diphenylmethane diisocyanate |
| from | 10% to | 30% of 2,4-2,6-toluene diisocyanate |

-continued

| from | 5% to | 10% of maleic arhydride |
| from | 40% to | 60% of poly(vinyl chloride) |
| from | 3% to | 10% of phthalic anhydride |
| from | 0.5% to | 7% of azodiisobutyronitrile |
| from | 0.1% to | 5% of azodicarbonamide |
| from | 1% to | 5% of styrene |
| from | 0.5% to | 2% of dibasic lead phthalate, | wherein the percentage of the individual components by weight is referred to the total weight of the compound, and said compound is mixed in the dissolver, is filtered, is poured directly into the mould, after the "curing" process and the subsequent transfer of the cured bodies into the mould, after performing the "pressure heating/cooling" cycle, the semifoamed germs will end their expansion inside ovens under a dynamic atmosphere of saturated steam.

The cellular foamed article will be submitted to a thermal treatment inside air ovens, at a temperature comprised within the range of from a minimum value of 80° C. to a maximum value of 125° C., for a time comprised within the range of from 24 hours to a maximum of 120 hours, and as the result, a cellular foamed article will be obtained, which has a density of 55 kg/m$^3$, a flexural heat distortion temperature comprised within the range of from 130° C. to 140° C., a compression strength at the temperature of 80° C. of 4.1 kg/cm$^2$, a very high chemical resistance such that, e.g., the absorption of styrene after a 2-hour soaking of a sample of foamed article is of 2% by weight, relatively to the weight of the tested product, suitable for withstanding industrial processing cycles involving temperatures of 120° C., pressures of 1 kg/cm$^2$ for a time of 90 minutes.

EXAMPLE 2

By performing the production cycle set forth in Example 1, and using a mixture consisting of:

| from | 1% to | 10% of 4,4'-diphenylmethane diisocyanate |
| from | 1% to | 27% of 2,4-2,6-toluene diisocyanate |
| from | 6% to | 9% of maleic anhydride |
| from | 50% to | 55% of poly(vinyl chloride) |
| from | 0.1% to | 1% of azodiisobutyronitrile |
| from | 0.1% to | 1% of azodicarbonamide |
| from | 1% to | 2.8% of styrene |
| from | 5% to | 10% of talc of "Micronic 00S" type |
| from | 0.5% to | 2.5% of tribasic lead sulfate |

With the percentage of the individual components by weight being referred to the total weight of the compound, the semi foamed germs having reached the desired foaming rate, after a thermal treatment inside air ovens inside which temperature is comprised within the range of from a minimum value of 90° C. to a maximum value of 140° C., for a time comprised within the range of from a minimum time of 48 hours to a maximum time of 360 hours, a cellular foamed article is obtained, which has a density of 300 kg/m$^3$, and is endowed with characteristics of flexural heat distortion temperature comprised within the range of from 150° C. to 160° C., compression strength at room temperature of 100 kg/cm$^2$, a nearly perfect chemical resistance in that, its styrene absorption after a 2-hour soaking of a sample of foamed article is of 0.1–0.2% by weight, relatively to the weight of the tested product, suitable for being used in industrial production cycles involving temperatures of 130° C., pressures of from 2 to 4 kg/cm$^2$ for a time of up to 5 hours.

EXAMPLE 3

A paste composed by a mixture of:

| from | 2% to | 20% of 4,4'-diphenylmethane diisocyanate |
| from | 10% to | 29% of 2,4-2,6-toluene diisocyanate |
| from | 5% to | 12% of maleic anhydride |
| from | 49% to | 60% of poly(vinyl chloride) |
| from | 4% to | 13% of phthalic anhydride |
| from | 0.5% to | 7% of azodiisobutyronitrile |
| from | 0.1% to | 2% of azodicarbonamide | from 0.5% to 1.5% of dibasic lead phosphite, with the percentages of individual components by weight being referred to the total weight of the compound, still according to the present manufacturing process, will yield a cellular foamed article having a density of 80 kg/m$^3$, a flexural heat distortion temperature of 100° C., a styrene absorption after a 2-hour soaking of the whole sample, of 1.7% by weight, relatively to the weight of the tested sample, good elasticity characteristics, constant use temperature of 80° C.

EXAMPLE 4

A paste composed by a mixture of:

| from | 5% to | 15% of 4,4'-diphenylmethane diisocyanate |
| from | 15% to | 25% of 2,4-2,6-toluene diisocyanate |
| from | 3% to | 10% of maleic anhydride |
| from | 45% to | 55% of poly(vinyl chloride) |
| from | 8% to | 14% of phthalic anhydride |
| from | 2% to | 10% of azodiisobutyronitrile |
| from | 0.02% to | 2% of azodicarbonamide |
| from | 0.2% to | 2% of polybasic lead phosphite-sulfate, | with the percentages of individual components by weight being referred to the total weight of the compound, still according to the present manufacturing process, will yield a cellular foamed article having a density of 30 kg/m$^3$, a flexural heat distortion temperature of 100° C., a compression strength of 2.7 kg/cm$^2$ at room temperature, a styrene absorption, according to the modalities of the preceding examples, of 6%, the structure of the cells is fine and regular.

The purpose mentioned in the preamble of the disclosure is thus achieved.

The scope of the invention is defined by the following claims.

I claim:

1. A process for producing a foamed polymer comprising the following steps:
    inside a dissolver, mixing a mixture constituted by 2,4-2,6-toluene diisocyanate and/or 4,4'-diphenylmethane diisocyanate and maleic anhydride which is charged to the dissolver in the liquid state and at a relatively high temperature;
    progressively cooling said mixture, with continuous stirring, until a temperature not higher than 22° C. is reached; adding to the cooled mixture, with continuous stirring, phthalic anahydride, styrene and; at least one foaming agent comprising azodiisobutyronitrile, azodicarbonamide or mixtures thereof to form a foamable mixture;
    keeping said foamable mixture with continuous stirring, at said temperature, until a mixture with a paste-like consistency (a "paste") is obtained, which is poured, after a preliminary filtration, into a mould, or container;

curing the paste by charging the container to an oven under atmospheric pressure and at a temperature not higher than 80° C.; for from 1 to 6 hours causing the paste to undergo complete curing under pressure, by increasing the temperature up to 180° C., and subsequent cooling until partially foamed germs are obtained; and completing the formation of foamed germs by heating in water, or inside ovens in the presence of steam.

2. A process according to claim 1 wherein:

said maleic anhydride ia at a temperature of around 70° C. when it is charged to the dissolver;

the mixture is kept with a first continuous stirring, with an impeller of the dissolver having a peripheral speed within the range of from 20 feet/second to 30 feet/second, said mixture is progressively cooled until a temperature comprised within the range of from 14° C. to 18° C. is reached;

after reaching and maintaining said temperature, to the mixture inside the dissolver said phthalic anhydride, said at least one foaming agent, said styrene, poly(vinyl chloride) and a heat stabilizer are added;

still with cooling, a second continuous stirring is conducted with the peripheral speed of the impeller set at a value within the range of from 53 feet/second up to 76 feet/second a resulting, homogeneous, paste is poured, after being filtered, into suitable containers, for the subsequent "curing" process, or directly into a mould, at a temperature which is kept comprised within the range of from 18° C. up to 22° C.;

the paste contained inside the suitable containers is charged to ovens inside which, with air circulation, wherein air circulates at a speed of 0.5–2 m/second, the relative humidity inside the chamber is of 15–20%, the temperature is comprised within the range of from a minimum value of 35° C. up to a maximum value of 80° C., for a time period ranging between 1 and 6 hours, the "grafting" reaction of maleic anhydride-styrene-poly(vinyl chloride) is initiated;

under pressure, and progressively increasing the operating temperature, the reaction is completed, with decomposition of the foaming agents, with azodiisobutyronitrile also acting as the "polymerization initiator", and when the temperature of 170° C.–180° C. is reached, the gelation of poly(vinyl chloride) takes place; and by cooling, partially foamed germs are obtained, which complete their foaming process by being submitted to heating in water, or inside ovens, in the presence of steam.

3. A process according to claim 1, in which said paste is constituted by a mixture of

| from | 1% to | 20% of 4,4'-diphenylmethane diisocyanate |
| from | 10% to | 30% of 2,4-2,6-toluene diisocyanate |
| from | 5% to | 10% of maleic anhydride |
| from | 40% to | 60% of poly(vinyl chloride) |
| from | 3% to | 10% of phthalic anhydride |
| from | 0.5% to | 7% of azodiisobutyronitrile |
| from | 0.1% to | 3% of azodicarbonamide |
| from | 1% to | 5% of styrene |
| from | 0.5% to | 2% of dibasic lead phthalate |

4. A process according to claim 1, in which said paste is constituted by a mixture of

| from | 1% to | 10% of 4,4'-diphenylmethane diisocyanate |
| from | 1% to | 27% of 2,4-2,6-toluene diisocyanate |
| from | 6% to | 9% of maleic anhydride |
| from | 50% to | 55% of poly(vinyl chloride) |
| from | 0.1% to | 1% of azodiisobutyronitrile |
| from | 0.1% to | 1% of azodicarbonamide |
| from | 1.5% to | 2.8% of styrene |
| from | 5% to | 10% of talc of "Micronic 00S" type |
| from | 0.5% to | 2.5% of tribasic lead sulate |

5. A process according to claim 1, in which said paste is constituted by a mixture of

| from | 2% to | 20% of 4,4'-diphenylmethane diisocyanate |
| from | 10% to | 29% of 2,4-2,6-toluene diisocyanate |
| from | 5% to | 12% of maleic anhydride |
| from | 49% to | 60% of poly(vinyl chloride) |
| from | 4% to | 13% of phthalic anhydride |
| from | 0.5% to | 7% of azodiisobutyronitrile |
| from | 0.1% to | 2% of azodicarbonamide |
| from | 0.5% to | 1.5% of dibasic lead phosphite |

6. A process according to claim 1, in which said paste is constituted by a mixture of

| from | 3% to | 15% of 4,4'-diphenylmethane diisocyanate |
| from | 15% to | 25% of 2,4-2,6-toluene diisocyanate |
| from | 3% to | 10% of maleic anhydride |
| from | 45% to | 55% of poly(vinyl chloride) |
| from | 8% to | 14% of phthalic anhydride |
| from | 2% to | 10% of azodiisobutyronitrile |
| from | 0.02% to | 2% of azodicarbonamide |
| from | 0.2% to | 2% of polybasic lead phosphite-sulfate |

7. A process according to claim 1, wherein in order to increase its characteristics of high temperature resistance, the foamed, cellular article is submitted to a thermal treatment in air ovens, inside which the temperature is comprised within the range of from a minimum value of 80° C., up to a maximum value of 140° C., and for a time period ranging from a minimum value of 24 hours, up to a maximum value of 360 hours.

8. A process according to claim 2, wherein the first continuous stirring is performed with the impeller of the dissolver having a peripheral speed of about 26.8 feet/second.

9. A process according to claim 2, wherein the second continuous stirring is performed with the peripheral speed of the impeller set at about 67 feet/second.

10. A process according to claim 1, wherein said maleic anhydride is at a temperature of around 70° C.; when it is charged to the dissolver the mixture is kept with a first continuous stirring, with an impeller of the dissolver having a peripheral speed within the range of from 20 feet/second to 30 feet/second said mixture is progressively cooled until a temperature comprised within the range of from 14° C. to 18° C. is reached; after reaching and maintaining such a temperature value, to the mixture inside the dissolver said phthalic anhydride, said at least one foaming agent, poly(vinyl cloride), and a heat stabilizer are added; still with cooling, a second continuous stirring is conducted with the peripheral speed of the impeller set at a value within the range of from 50 feet/second up to 76 feet/second a resulting, homogeneous, paste is poured, after being filtered, into suitable containers, for the subsequent "curing" process, or directly into a mould, at a temperature which is kept within the range of from 180° C. up to 22° C. ; the paste contained inside the suitable containers is charged to ovens inside which, with air circulation, wherein air circulates at a speed of 0.5-2 m/second, the relative humidity inside the chamber is of 15-20% , the temperature is comprised within the range of from a minimum value of 35° C. up to a maximum value of 80° C, for a time period ranging between 1 and 6 hours, said paste undergo curing;

under pressure, and progressively increasing the operating temperature, the reaction is completed, with the decomposition taking place of the foaming agents, with azodiisobutyronitrile also acting as the "polymerization initiator", and when the temperature of 170° C.-180° C. is reached, the gelation of poly(vinyl chloride) taking place; and by cooling, partially foamed germs are obtained, which complete their foaming process by being submitted to heating in water, or inside ovens, in the presence of steam.

11. A process according to claim 10, wherein the first continuous stirring is performed with the impeller of the dissolver having a peripheral speed of about 26.8 feet/second.

12. A process according to claim 10, wherein the second continuous stirring is performed with the peripheral speed of the impeller set at about 67 feet/second.

* * * * *

UNITED STATES PATENT AND TRADEMARK OFFICE
CERTIFICATE OF CORRECTION

PATENT NO. : 5,216,039
DATED : June 1, 1993
INVENTOR(S) : Leone Lauri

It is certified that error appears in the above-indentified patent and that said Letters Patent is hereby corrected as shown below:

Column 4:

In Claim 1, in line 11, "anahydride" should read as --anhydride--;

Column 5:

In Claim 2, in line 2, "ia" should read as --is--;

In Claim 2, in line 4, "first" should be deleted;

Column 6:

In Claim 10, in line 2, after "70 C.", the ";" should be deleted;

In Claim 10, in line 3, after "dissolver" and before "the", insert --;--;

In Claim 10, in line 6, after "second", second occurrence, and before "said", insert --;--;

In Claim 10, in line 15, after "second", second occurrence, and before "a", insert --;--; and In Claim 10, in line 19, "180 C." should read as --18 C.--.

UNITED STATES PATENT AND TRADEMARK OFFICE
CERTIFICATE OF CORRECTION

PATENT NO. : 5,216,039

DATED : June 1, 1993

INVENTOR(S) : Leon Lauri

It is certified that error appears in the above-indentified patent and that said Letters Patent is hereby corrected as shown below:

Column 6, claim 10, line 19, "180 C." should read --18 C.--.

Signed and Sealed this

Fifteenth Day of March, 1994

Attest:

BRUCE LEHMAN

Attesting Officer     Commissioner of Patents and Trademarks